(12) United States Patent
Omura et al.

(10) Patent No.: US 8,168,010 B2
(45) Date of Patent: *May 1, 2012

(54) LOW ALLOY STEEL FOR OIL WELL PIPES HAVING EXCELLENT SULFIDE STRESS CRACKING RESISTANCE

(75) Inventors: Tomohiko Omura, Osaka (JP); Kenji Kibayashi, Osaka (JP)

(73) Assignee: Sumitomo Metal Industries, Ltd., Osaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/640,030

(22) Filed: Dec. 14, 2006

(65) Prior Publication Data

US 2007/0137736 A1    Jun. 21, 2007

Related U.S. Application Data

(63) Continuation of application No. PCT/JP2005/010225, filed on Jun. 3, 2005.

(30) Foreign Application Priority Data

Jun. 14, 2004  (JP) .................................. 2004-175242

(51) Int. Cl.
*C22C 38/32* (2006.01)
(52) U.S. Cl. ........................................ 148/330; 420/106
(58) Field of Classification Search .................. 148/330; 420/106

See application file for complete search history.

(56) References Cited

U.S. PATENT DOCUMENTS

| 5,938,865 A * | 8/1999 | Kondo et al. ............... 148/593 |
| 7,670,547 B2 * | 3/2010 | Kobayashi et al. ........... 420/121 |
| 2008/0017284 A1 * | 1/2008 | Omura ...................... 148/593 |

FOREIGN PATENT DOCUMENTS

| EP | 0 828 007 A1 | 3/1998 |
| JP | 59-232220 | 12/1984 |
| JP | 62-253720 | 11/1987 |
| JP | 06220536 | 8/1994 |
| JP | 06-322478 | 11/1994 |

(Continued)

OTHER PUBLICATIONS

International Search Report dated Nov. 15, 2005 in corresponding PCT/JP2005/010225.

(Continued)

*Primary Examiner* — Jie Yang
(74) *Attorney, Agent, or Firm* — Marshall, Gerstein & Borun LLP

(57) ABSTRACT

Disclosed is a low alloy steel for oil well pipes which has excellent sulfide stress cracking resistance and is suitable for casing and tubing for oil wells or gas wells. Specifically disclosed is a low alloy steel for oil well pipes containing, in mass %, 0.2-0.35% of C, 0.05-0.5% of Si, 0.05-1.0% of Mn, not more than 0.025% of P, not more than 0.01% of S, 0.005-0.10% of Al, 0.1-1.0% of Cr, 0.5-1.0% of Mo, 0.002-0.05% of Ti, 0.05-0.3% of V, 0.0001-0.005% of B, not more than 0.01% of N, not more than 0.01% of O (oxygen), 0-0.1% of Nb, 0-0.01% of Ca, 0-0.01% of Mg and 0-0.1% of Zr, and having a half-value breadth (H) and a hydrogen diffusion coefficient (D) ($10^{-6}$ cm$^2$/s) satisfying the following formula (1):

$$30H+D \leq 19.5 \tag{1}.$$

2 Claims, 4 Drawing Sheets

FOREIGN PATENT DOCUMENTS

| | | |
|---|---|---|
| JP | 7041856 A * | 2/1995 |
| JP | 08-311551 | 11/1996 |
| JP | 09-059719 | 3/1997 |
| JP | 11050148 | 2/1999 |
| JP | 11061254 | 3/1999 |
| JP | 11286720 | 10/1999 |
| JP | 11-335731 | 12/1999 |
| JP | 2000-119798 | 4/2000 |
| JP | 2000-178682 | 6/2000 |
| JP | 2000219914 | 8/2000 |
| JP | 2000-256783 | 9/2000 |
| JP | 2000-297344 | 10/2000 |
| JP | 2001073086 | 3/2001 |
| JP | 2001131698 | 5/2001 |
| JP | 2001172739 | 6/2001 |
| JP | 2001271134 | 10/2001 |
| JP | 2002-060893 | 2/2002 |
| JP | 2004-002978 | 1/2004 |
| UA | 56411 A | 5/2003 |

OTHER PUBLICATIONS

Translation of International Preliminary Examination Report dated Dec. 14, 2006 in corresponding PCT/JP2005/010225, 2 pages.

Translation of Written Opinion dated Dec. 14, 2006 in corresponding PCT/JP2005/010225, 4 pages.

\* cited by examiner

LOW ALLOY STEEL FOR OIL WELL PIPES HAVING EXCELLENT SULFIDE STRESS CRACKING RESISTANCE

CROSS-REFERENCE TO RELATED APPLICATIONS

This application is a continuation of application PCT/JP2005/010225 filed on Jun. 3, 2005 and claims the benefit of priority from JP2004-175242 filed Jun. 14, 2004 under 35 U.S.C. 1.19 (a-d).

TECHNICAL FIELD

The present invention relates to a low alloy steel for oil well pipes which is excellent in sulfide stress cracking resistance, which makes it suitable for casing or tubing for use in oil wells or gas wells.

BACKGROUND ART

Along with an increase of the depth of the wells for oil fields and gas fields, higher strength has been in demand for oil well pipes used in oil wells or gas wells. Instead of 80 ksi class (yield stress (YS) of 551 to 654 MPa) or 95 ksi class (YS of 654 to 758 MPa) of oil well pipes generally used so far, oil well pipes of 110 ksi class (YS of 758 to 861 MPa) have been used frequently in recent years.

On the other hand, recently developed deep wells often contain corrosive hydrogen sulfide. Under such circumstances, high strength steels cause hydrogen brittleness which is referred to as sulfide stress cracking (hereinafter referred to as "SSC"), which sometimes results in the fracture of the oil well pipes. Accordingly, the most significant subject in high strength oil well pipes is to overcome SSC.

One method of improving the SSC resistance in oil well pipes of the 95 to 110 ksi class is to purify steels highly or to refine the crystal grains of the micro-structure. For example, Patent Document 1 proposes a method of improving the SSC resistance by reducing the impurity elements such as Mn and P. Patent Document 2 describes a method of improving the SSC resistance by refining crystal grains by quenching twice.

Further, studies on high strength oil well pipes, such as of 125 ksi class (YS of 861 to 965 MPa) have been started in recent years. Since SSC is more likely to occur in the higher strength steels, a further improvement in the material design for oil well pipes of 125 ksi class has been in demand than for prior oil well pipes of the 95 ksi class (YS of 654 to 758 MPa) or the 110 ksi class (YS of 758 to 861 MPa). Patent Document 3 proposes a method for obtaining steel materials of the 125 ksi class which is excellent in the SSC resistance that the crystal grains of the micro-structure is refined by a heat treatment using an induction heating. Patent Document 4 proposes a method for manufacturing a steel pipe of the 110 to 125 ksi class and in the 140 ksi class (YS of 965 to 1068 MPa) which is excellent in the SSC resistance, by increasing the hardenability and the tempering temperature with a direct quenching method. Patent Document 5 proposes a technique of obtaining a low alloy steel of the 110 to 140 ksi class with excellent SSC resistance by optimizing the alloy composition. Patent Document 6, Patent Document 7, and Patent Document 8 propose methods for improving the SSC resistance of a low alloy steel used for oil wells of the 110 to 140 ksi class by controlling the forms of carbides. Further, Patent Document 9 proposes a technique of retarding the occurrence of SSC of the 110 to 125 ksi class steel materials by precipitating a large amount of fine Vanadium carbides.

[Patent Document 1] Japanese Patent Unexamined Publication No. S 62-253720
[Patent Document 2] Japanese Patent Unexamined Publication No. S 59-232220
[Patent Document 3] Japanese Patent Unexamined Publication No. H6-322478
[Patent Document 4] Japanese Patent Unexamined Publication No. H8-311551
[Patent Document 5] Japanese Patent Unexamined Publication No. H11-335731
[Patent Document 6] Japanese Patent Unexamined Publication No. 2000-178682
[Patent Document 7] Japanese Patent Unexamined Publication No. 2000-256783
[Patent Document 8] Japanese Patent Unexamined Publication No. 2000-297344
[Patent Document 9] Japanese Patent Unexamined Publication No. 2000-119798

SUMMARY OF THE INVENTION

Even the proposed steels described above cannot stably ensure SSC resistance. The present invention intends to provide an SSC resistant steel for oil well pipes capable of stably ensuring excellent SSC resistance even when used for high strength oil well pipes of the 125 ksi class or higher classes.

Means for Solving the Problem

The present inventors have made various studies on causes for the occurrence of SSC and means for solving them in high strength steels for oil well pipes by taking notice of dislocation density and a hydrogen diffusion coefficient thereof and, as a result, have found that the dislocation density and the hydrogen diffusion coefficient are correlated with the SSC resistance as described below.

(a) It is considered that SSC tends to occur in high strength steels because, as the strength increases, the dislocation density of crystals tends to increase and diffusive hydrogen tends to be occluded more in the dislocated portions. In view of the above, the occurrence of SSC can be suppressed by decreasing the trapped hydrogen, even in a high strength steel, which can be obtained by decreasing the dislocation density of crystals as little as possible in order to decrease the dislocation portion.

(b) It is alternatively considered that SSC tends to occur in high strength steel because hydrogen accumulates on stress concentrated portions such as the bottom of pit corrosion. In view of the above, occurrence of SSC can be suppressed by preventing the accumulation of hydrogen on the stress concentrated portions, which can be accomplished by designing a material for preventing the diffusion of hydrogen in the material.

(c) The dislocation density is dominated by a half-value width of the [211] crystal face (degree of strain of crystal lattices) determined by an X-ray diffraction. And the diffusion of hydrogen in the material is dominated by the hydrogen diffusion coefficient of steel determined by a hydrogen permeation method.

(d) Accordingly, it is possible to provide high strength oil well pipes, excellent in SSC resistance, when the half-value width and the hydrogen diffusion coefficient can be controlled to desired values.

The present invention has been achieved based on such novel findings. A high strength steel for oil well pipes, according to the invention, is as described in the following (1) to (5).

Hereinafter, the inventions relating to the steels of (1) to (5) can be collectively referred in the present invention.

(1) A low alloy steel for oil well pipes containing, by mass %, C: 0.2 to 0.35%, Si: 0.05 to 0.5%, Mn: 0.05 to 1.0%, P: 0.025% or less, S: 0.01% or less, Al: 0.005 to 0.10%, Cr: 0.1 to 1.0%, Mo: 0.5 to 1.0%, Ti: 0.002 to 0.05%, V: 0.05 to 0.3%, B: 0.0001 to 0.005%, N: 0.01% or less, O (oxygen): 0.01% or less, Nb: 0 to 0.1%, Ca: 0 to 0.01%, Mg: 0 to 0.01% and Zr: 0 to 0.1%, in which the half-value width H and the hydrogen diffusion coefficient D ($10^{-6}$ cm$^2$/s) satisfy the following equation (1):

$$30H + D \leq 19.5 \quad \text{equation (1)}.$$

(2) A low alloy steel for oil well pipes according to (1) above, wherein a yield stress is 861 MPa or more.

(3) A low alloy steel for oil well pipes according to either of the (1) above or the (2) above, characterized by further containing Nb: 0 to 0.1%, by mass.

(4) A low alloy steel for oil well pipes according to any one of the (1) to (3) above, characterized by further containing one or both of Ca: 0 to 0.01% and Mg: 0 to 0.01%, by mass.

(5) A low alloy steel for oil well pipes according to any one of the (1) to (4) above, characterized by further containing Zr: 0 to 0.1%, by mass.

Effect of the Invention

According to the present invention, an oil well pipes having excellent SSC resistance can be stably provided even at a high strength of yield stress (YS) of 861 MPa or more.

BEST MODE FOR CARRYING OUT THE INVENTION

A high strength steel for oil well pipes according to the present invention is specifically described as follows:

A. Half-Value Width and Hydrogen Diffusion Coefficient of Steel

In the steel for use of the oil well pipes according to the present invention, since it is necessary that the half-value width and the hydrogen diffusion coefficient are controlled so as to satisfy the equation (1), a method of measuring the half-value width and the hydrogen diffusion coefficient of the steel will be described first.

Steels having the chemical composition shown in Table 1 were each, by 150 kg, melted in vacuum, were hot forged and then hot rolled into a plate and then applied with quenching and tempering.

TABLE 1

| Steel | \multicolumn{16}{c}{Chemical composition (mass %)} | | | | | | | | | | | | | | | |
|---|---|---|---|---|---|---|---|---|---|---|---|---|---|---|---|---|
| | C | Si | Mn | P | S | sol. Al | Cr | Mo | Ti | V | B | Nb | Zr | Ca | Mg | N | O |
| (a) | 0.27 | 0.19 | 0.43 | 0.005 | 0.0018 | 0.034 | 0.50 | 0.73 | 0.015 | 0.11 | 0.0011 | — | — | — | — | 0.0044 | 0.0031 |
| (b) | 0.28 | 0.21 | 0.44 | 0.008 | 0.0011 | 0.033 | 0.51 | 0.71 | 0.016 | 0.02 | 0.0012 | — | — | — | — | 0.0034 | 0.0042 |
| (c) | 0.28 | 0.18 | 0.45 | 0.004 | 0.0012 | 0.032 | 1.21 | 0.74 | 0.016 | 0.12 | 0.0009 | — | — | — | — | 0.0036 | 0.0043 |
| (d) | 0.26 | 0.15 | 0.43 | 0.003 | 0.0011 | 0.034 | 1.51 | 0.35 | 0.015 | 0.11 | 0.0011 | — | — | — | — | 0.0034 | 0.0041 | note:
The balance is Fe and impurities.

In this case as shown in Table 2, the total working ratio (%) and the hot rolling finishing temperature (° C.) were varied. The total working ratio (%) means a value represented by the following:

Total working ratio (%) = 100 × {(cross sectional area of plate before working) − (cross sectional area after final working)}/(cross sectional area of plate before working).

TABLE 2

| Test No. | Steel | Total work ratio (%) | Rolling finishing temp. (° C.) | Quenching temp. (° C.) | Strength YS (MPa) | Half value width H | Hydrogen diffusion coefficient D($10^{-6}$ cm$^2$/s) | 30H + D | SSC test result | |
|---|---|---|---|---|---|---|---|---|---|---|
| | | | | | | | | | Constant load test | DCB test (stress intensity factor $K_{ISSC}$) |
| 1 | (a) | 20.5 | 1060 | 920 | 951 | 0.41 | 2.1 | 14.4 | ○ | 27.1 |
| 2 | (a) | 7.2 | 1100 | 910 | 958 | 0.47 | 2.3 | 16.4 | ○ | 28.1 |
| 3 | (a) | 7.1 | 960 | 930 | 944 | 0.51 | 3.9 | 19.2 | ○ | 27.8 |
| 4 | (a) | 25.6 | 1050 | 1050 | 958 | 0.33 | 1.1 | 11.0 | ○ | 30.5 |
| 5 | (a) | 40.5 | 1090 | 1030 | 944 | 0.31 | 1.3 | 10.6 | ○ | 30.1 |
| 6 | (a) | 37.6 | 990 | 920 | 951 | 0.36 | 3.9 | 14.7 | ○ | 27.6 |
| 7 | (a) | 62.6 | 970 | 950 | 958 | 0.49 | 3.4 | 18.1 | ○ | 28.1 |
| 8 | (a) | 30.5 | 940 | 920 | 937 | 0.57 | 4.3 | 21.4 | X | 24.2 |
| 9 | (a) | 53.5 | 1030 | 990 | 958 | 0.39 | 2.8 | 14.5 | ○ | 29.4 |
| 10 | (a) | 69.1 | 1060 | 920 | 944 | 0.64 | 2.3 | 21.5 | X | 20.9 |
| 11 | (a) | 35.5 | 1050 | 890 | 951 | 0.56 | 5.5 | 22.3 | X | 23.1 |
| 12 | (a) | 3.5 | 920 | 850 | 958 | 0.68 | 6.1 | 26.5 | X | 19.5 |
| 13 | (a) | 5.3 | 910 | 830 | 951 | 0.63 | 6.8 | 25.7 | X | 21.2 |
| 14 | (a) | 15.4 | 1040 | 950 | 944 | 0.31 | 8.1 | 17.4 | ○ | 28.4 |
| 15 | (a) | 25.4 | 1030 | 920 | 958 | 0.55 | 1.2 | 17.7 | ○ | 27.9 |
| 16 | (b) | 20.5 | 990 | 920 | 944 | 0.45 | 9.2 | 22.7 | X | 20.2 |

TABLE 2-continued

| Test No. | Steel | Total work ratio (%) | Rolling finishing temp. (° C.) | Quenching temp. (° C.) | Strength YS (MPa) | Half value width H | Hydrogen diffusion coefficient D($10^{-6}$ cm$^2$/s) | 30H + D | SSC test result Constant load test | SSC test result DCB test (stress intensity factor $K_{ISSC}$) |
|---|---|---|---|---|---|---|---|---|---|---|
| 17 | (b) | 24.6 | 1040 | 920 | 937 | 0.32 | 11.5 | 21.1 | X | 20.1 |
| 18 | (c) | 31.3 | 1050 | 920 | 944 | 0.69 | 1.3 | 22.0 | X | 19.8 |
| 19 | (c) | 34.6 | 1100 | 920 | 951 | 0.59 | 2.2 | 19.9 | X | 23.1 |
| 20 | (d) | 25.5 | 1090 | 920 | 944 | 0.63 | 10.8 | 29.7 | X | 22.4 |
| 21 | (d) | 25.3 | 1050 | 920 | 944 | 0.62 | 8.9 | 27.5 | X | 23.5 |

The quenching and tempering were applied for controlling the strength of materials (YS) to the vicinity of the upper limit of 125 ksi class and they had the strength as shown in Table 2. Quenching was conducted by water cooling after keeping it at various temperatures for 30 minutes, and the tempering was conducted by air cooling after keeping it at various temperatures for one hour, respectively.

A test piece sized 1×10×10 mm$^3$ was sampled from the steel materials, polished with 1200# emery paper, then the work hardened layer was removed from the surface of the test piece by immersing it in an aqueous hydrogen peroxide at room temperature with an addition of a slight amount of hydrofluoric acid. It was subjected to an X-ray diffraction test in order to measure the half-value width for the peak of the [211] crystal face.

Further, a round bar with a parallel portion diameter of 6 mm and a parallel portion length of 40 mm was sampled as a tensile test piece from the steel materials in the rolling direction, and subjected to a tensile test at a room temperature, and the strength of the test piece was determined based on the measured value for YS.

Two types of methods, a constant load test and a DCB test, were conducted for evaluation of the SSC resistance. The results are shown in Table 2.

At first, an evaluation by the constant load test was conducted by sampling a round bar, with a parallel portion diameter of 6.35 mm and a parallel portion length of 25.4 mm, as a tensile test piece from the steel materials in the rolling direction and in accordance with the NACE (National Association of Corrosion Engineers) TM 0177A method. Two kinds of test baths were used. One is an aqueous solution of 5 mass % sodium chloride+0.5 mass % acetic acid at a room temperature saturated with a hydrogen sulfide gas (balanced with gaseous carbon dioxide) at 0.1 atm (hereinafter referred to as "bath A"). The other is an aqueous solution of 5 mass % sodium chloride+0.5 mass % acetic acid at a room temperature saturated with hydrogen sulfide gas at 1 atm (hereinafter referred to as "bath B"). The test pieces were each judged on whether it fractured or not within 720 hours at a loading of 90% stress for the YS value shown in Table 2. An unfractured test piece was evaluated as having good SSC resistance.

Then, evaluation by the DCB test was conducted by sampling a rectangular piece with 10 mm thickness, 20 mm width and the 100 mm length as a DCB (Double Cantilever Bent Beam) test piece from the steel materials in accordance with the NACE TM 0177D method. The test pieces were immersed in the bath A and the bath B for 336 hours in order to measure a stress intensity factor $K_{ISSC}$ value. The measured values for the results are shown in Table 2. In a case where the stress intensity factor $K_{ISSC}$ value is 25 or more, it is judged that the SSC resistance is favorable.

Further, a disk piece of 70 mm diameter and 1.5 mm thickness was sampled as a test piece from the steel materials and the hydrogen diffusion coefficient was measured by a hydrogen permeation test.

$$D = L^2/(7.14 t_{1/2}) \qquad \text{equation (2)}$$

in which D: hydrogen diffusion coefficient (cm$^2$/s),
L: thickness of specimen (cm),
$t_{1/2}$: time (s) till the hydrogen permeation current value reaches one half of the stationary value Table 2 shows the result of calculation for the hydrogen diffusion coefficient D ($10^{-6}$ cm$^2$/s). Table 2 also describes the manufacturing conditions for the steel materials (total working ratio, rolling finishing temperature, quenching temperature), strength (YS), half-value width H and results of SSC test (constant load test, DCB test) together.

Figure 3:
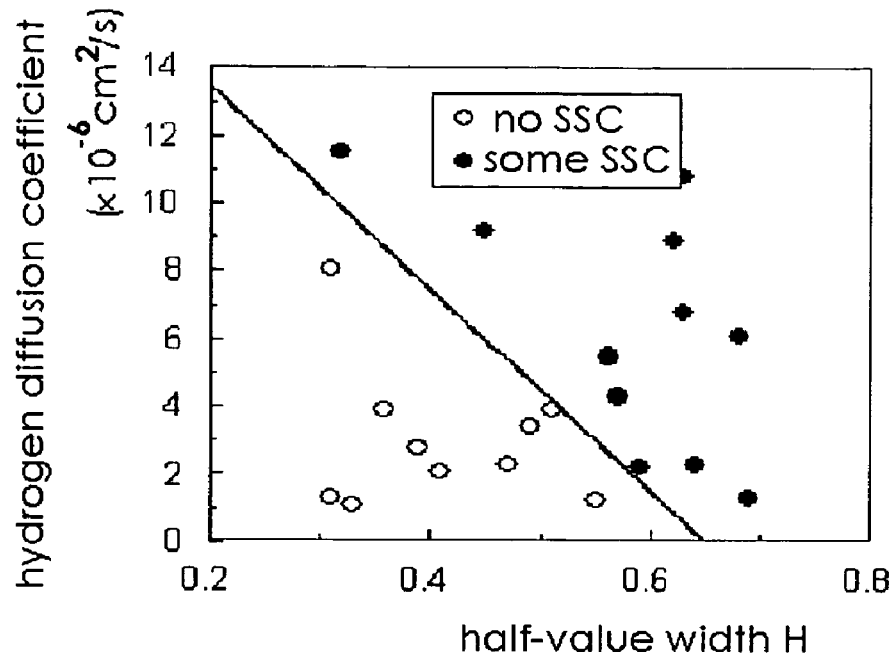

FIG. 3 is a graph arranging the result of the constant load test in which the horizontal axis expresses the half-value width H and the column expresses the hydrogen diffusion coefficient D ($10^{-6}$ cm$^2$/s). It can be seen that the SSC resistance is improved as both the half-value width and the hydrogen diffusion coefficient are decreased. It can be recognized that the sufficient SSC resistance for 125 ksi class is ensured when the relationship between the half-value width H and the hydrogen diffusion coefficient D ($10^{-6}$ cm$^2$/s) can satisfy the following equation (1):

$$30H + D \leq 19.5 \qquad \text{equation (1)}$$

Now, a method of decreasing the half-value width and the hydrogen diffusion coefficient of a steel will be described. The steel for oil well pipes, according to the invention, can be provided with half-value width and hydrogen diffusion coefficient satisfying the equation (1) by controlling the manufacturing conditions for the steel materials (total working ratio, rolling finishing temperature, quenching temperature) and chemical composition even for the high strength steel as shown in (i) to (iv) below.

Figure 4:
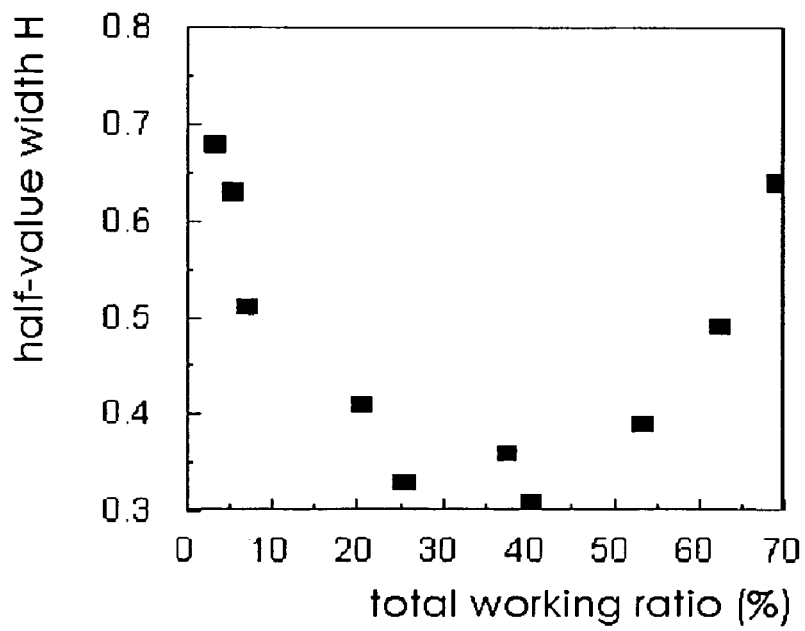

(i) FIG. 4 shows the result of the investigation for the correlation between the total working ratio and the half-value width for the steel (a) in Table 1. As can be seen from FIG. 4, the half-value width increases when the total working ratio is too large. It is considered that this is attributed to the working strain during rolling which still remains after the heat treatment when the total working ratio is too large. Furthermore, the half-value width is also increased when the total working ratio is too small. It is considered that this is attributed to the coarse micro-structure which grows after quenching when the total working ratio is too small.

Figure 5:
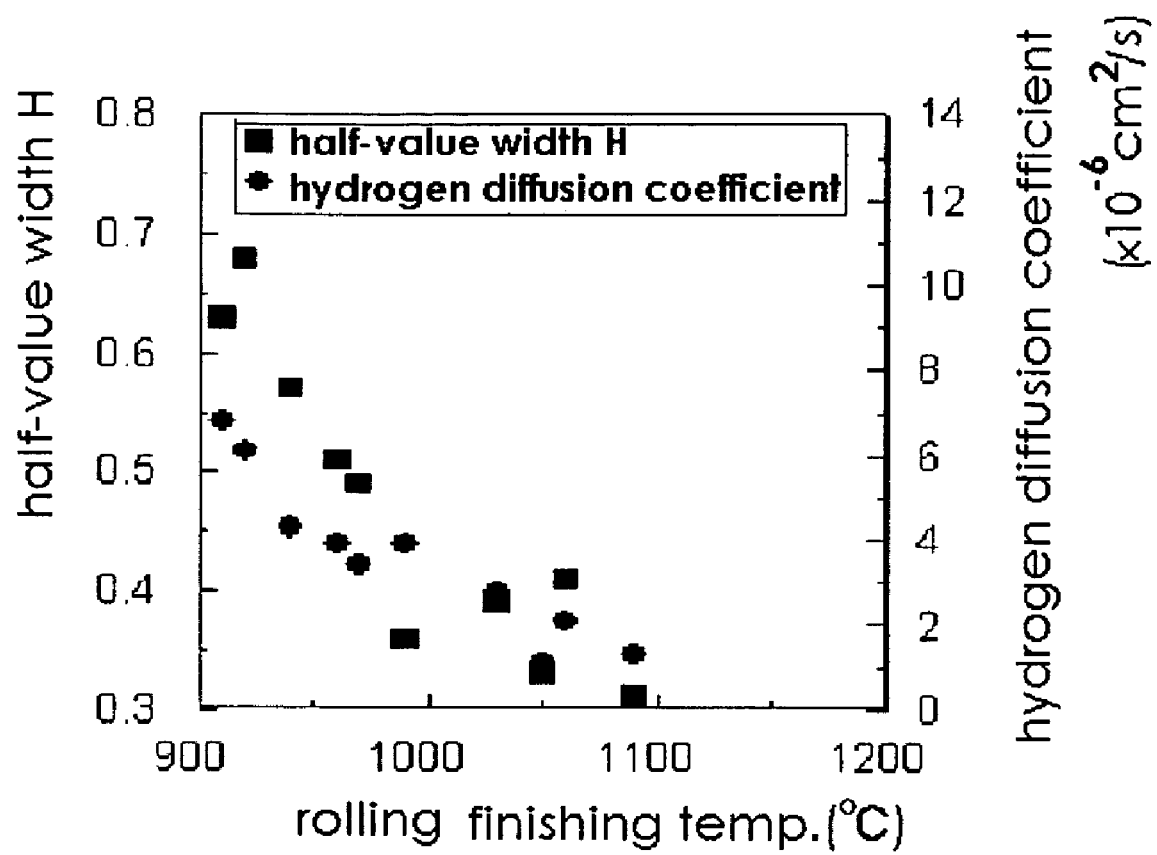

(ii) FIG. 5 shows the result of the investigation for the correlation between the rolling finishing temperature and the half-value width, and the correlation between the rolling finishing temperature and the hydrogen diffusion coefficient of the steel (a) in Table 1. As can be seen from FIG. 5, the half-value width and the hydrogen diffusion coefficient decreases as the rolling finishing temperature increases. It is considered that this is attributed to the fact that, as the rolling finishing temperature increases, fine carbide forming elements, such as Mo and V, are sufficiently solid solute into the steel upon completion of the rolling, which leads to precipitating fine carbides during the subsequent heat treatment.

Figure 6:
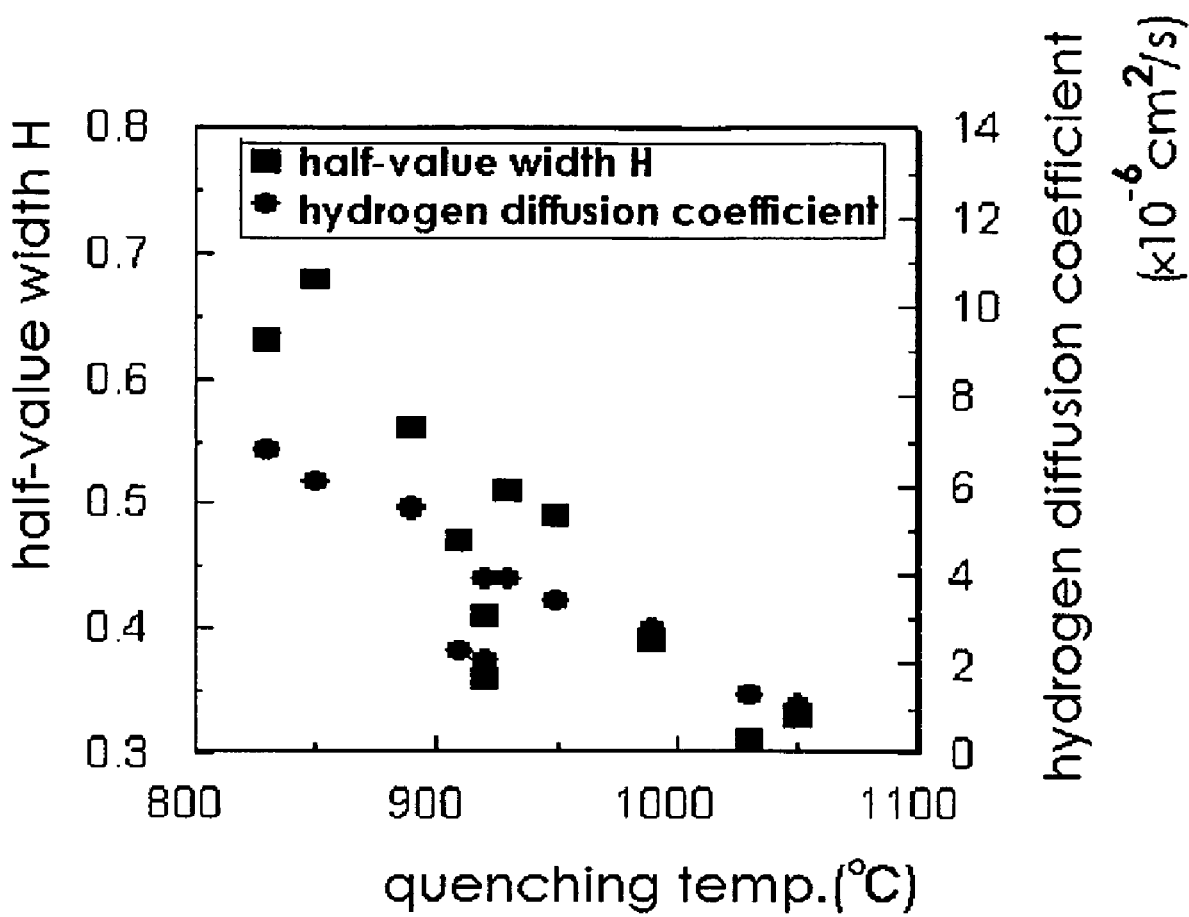

(iii) FIG. 6 shows the result of the investigation for the correlation between the quenching temperature and the half-value width, and the correlation between the quenching temperature and the hydrogen diffusion coefficient. As can be seen from FIG. 6, both the half-value and the hydrogen diffusion coefficient decrease as the quenching temperature increases. It is also considered that this is attributed to the fact that, similar to (ii) above, as the quenching temperature increases, fine carbide forming elements, such as Mo and V, are sufficiently solid solute into the steel upon completion of the rolling, which leads to precipitating fine carbides during the subsequent heat treatment.

DETAILED DESCRIPTION OF THE INVENTION (iv) It can be seen from Table 2 described above that both the half-value width and the hydrogen diffusion coefficient increase and the SSC resistance is not favorable in the steel (b) with low V content and the steel (d) with low Mo content, even when manufactured under the same conditions as in the steel (a). It is considered that this is attributed to the fact that the amount of V and Mo is insufficient to form fine carbides.

It can be also seen from Table 2 described above that the half-value width decreases in the steel (c) of high Cr content. It is considered that this is attributed to the fact that Cr is sufficiently solid solute into the steel, which leads to increasing the dislocation density.

Accordingly, in order to decrease the half-value width and the hydrogen diffusion coefficient sufficiently, it is necessary to control Cr to 1.0% or less, Mo to 0.5% or more, and V to 0.05% or more by mass %.

B. Chemical Composition of Steel

The chemical composition of the steel for oil well pipes according to the invention is now described. "%" represents herein "% by mass".

C: 0.2 to 0.35%

C is an element which effectively increases the hardenability thereby improving strength. In a case where the content is less than 0.2%, the hardenability decreases, thereby failing to obtain a sufficient strength. On the other hand, when the content exceeds 0.35%, the quenching cracking increases, so the upper limit is defined as 0.35%. A preferred range is from 0.25 to 0.30%.

Si: 0.05 to 0.5%

Si is an element effective in deoxidizing steel and also has an effect of increasing the resistance to temper softening. With an aim of deoxidation, it has to contain 0.05% or more. On the other hand, when the content exceeds 0.5%, it promotes precipitation of a ferrite phase as a softened phase and deteriorates the toughness and SSC resistance. Accordingly, the Si content is defined as 0.05 to 0.5%. A preferred range is from 0.05 to 0.3%.

Mn: 0.05 to 1.0%

Mn is an element effective to ensure the hardenability of steel. In view of that purpose, it has to contain 0.05% or more. On the other hand, when it exceeds 1%, it segregates together with impurity elements, such as P and S, to a grain boundary which deteriorates the toughness and the SSC resistance. Accordingly the Mn content is defined as 0.05 to 1%. A desirable range is from 0.1 to 0.6%.

P: 0.025% or less

P segregates to the grain boundary which deteriorates the toughness and the SSC resistance. Since this effect becomes remarkable when the content exceeds 0.025%, the upper limit is defined as 0.025%. The upper limit for P is preferably 0.015%. It is desirable that the P content is as little as possible.

S: 0.01% or less

S also segregates to the grain boundary, similar to P, which deteriorates the toughness and the SSC resistance. Since the effect becomes remarkable when the content exceeds 0.01%, the upper limit is defined as 0.01%. The upper limit for S is preferably 0.003%. It is desirable that the S content is as little as possible.

Al: 0.005 to 0.10%

Al is an element which is effective in the deoxidation of steel. When the content is less than 0.005%, a sufficient effect can not be obtained. On the other hand, since the effect is saturated even when it exceeds 0.10%, the upper limit thereof is defined as 0.10%. The Al content in the invention means acid soluble Al (so-called "sol. Al").

Cr: 0.1 to 1.0%

Cr is an element which effectively improves the hardenability of steel. In order to obtain this effect, it has to contain 0.1% or more. However, in a case where the content exceeds 1.0%, its increases the dislocation density of the steel, which deteriorates the SSC resistance. Accordingly, the Cr content is defined as 0.1 to 1.0%. A preferred range is from 0.1 to 0.6%.

Mo: 0.5 to 1.0%

Mo is an important element in the steel of the invention since it improves the hardenability of steel, as well as forms fine carbides during tempering. It also decreases the half-value width and the hydrogen diffusion coefficient, which improve the SSC resistance. In order to obtain this effect, it has to contain 0.5% or more. On the other hand, since the effect thereof is saturated, even if it contains more than 1.0%, the upper limit is defined as 1.0%. A preferred range is from 0.6 to 0.8%.

Ti: 0.002 to 0.05%

Ti has an effect of forming nitride by reacting with N that is an impurity in the steel. The amount of Ti that has not reacted with N forms fine precipitates of carbides, which result effectively in fine-grained steel by the pinning effect. Nitride forming also suppresses the reaction of N with B that is added for the improvement of the hardenability of steel, which results in keeping B in a solid solute state that ensures a sufficient hardenability.

In order to obtain this, Ti has to contain 0.002% or more. On the other hand, the effect is saturated and the toughness deteriorates, even when it contains more than 0.05%. Then, the upper limit is defined as 0.05%. A preferred content is 0.005 to 0.03%. A further preferred content is 0.01 to 0.02%.

V: 0.05 to 0.3%

V is an important element in the steel of the invention. It precipitates forming fine carbides during tempering, similar to Mo, which are effective in order to decrease the half-value width and also to decrease the hydrogen diffusion coefficient during high temperature tempering. In order to obtain this, the content has to contain 0.05% or more. On the other hand, the effect is saturated even when it contains more than 0.3%. Then, the upper limit is defined as 0.3%. A preferred range is 0.05 to 0.20%.

B: 0.0001 to 0.005%

Even slight amount of B has an effect of improving the hardenability of the steel. If the content is less than 0.0001%, the effect is not sufficient. On the other hand, when it exceeds 0.005%, the effect is saturated and it forms $Cr_{23}(C, B)_6$ as coarse carbides at the grain boundary which deteriorates the SSC resistance. Accordingly, the upper limit is defined as 0.005%. A preferred range is from 0.0002 to 0.002%.

N: 0.01% or less

N exists as an impurity in the steel and segregates to the grain boundary which deteriorates the SSC resistance. Further, adding Ti or Zr, it forms TiN or ZrN. If the N content exceeds 0.01%, the excess amount of N that has not reacted with Ti or Zr forms precipitates of BN. This results in an insufficient effect of improving the hardenability by adding B, which deteriorates the SSC resistance and the toughness. Accordingly, the upper limit is defined as 0.01%. The upper limit of N is preferably 0.007%. It is desirable that the N content is as little as possible.

O (oxygen): 0.01% or less

O (oxygen) exists as an impurity in the steel, similar to N. If the content exceeds 0.01%, it forms coarse oxides which deteriorate the toughness and the SSC resistance. Accordingly, the upper limit is defined as 0.01%. The upper limit for O (oxygen) is preferably 0.005%. It is desirable that the content of O (oxygen) be as little as possible.

Regarding the steel for oil well pipes according to the invention it could contain other components such as Nb, Zr, Ca, and Mg, in addition to Fe.

Nb: 0 to 0.1%

Nb is an optionally added. When added, it forms precipitates of carbides which result effectively in fine grained steel by the pinning effect. In order to obtain this effect, it has to contain 0.002% or more. On the other hand, the effect is saturated and the toughness deteriorates due to the excessively formed carbides of Nb even when it contains more than 0.1%. Then, the upper limit is defined as 0.1%. A preferred range is 0.005 to 0.03%.

Zr: 0 to 0.1%

Zr is an optionally added. When added, it has an effect of forming nitride by reacting with N that is an impurity in the steel. The amount of Zr that has not reacted with N forms fine precipitates of carbides, which result effectively in fine grained steel by the pinning effect. Nitride forming suppresses the reaction of N with B that is added for the improvement of the hardenability of steel, which results in keeping B in a solid solute state that ensures a sufficient hardenability.

In order to obtain this, Zr has to contain 0.002% or more. On the other hand, the effect is saturated and the toughness deteriorates, even when it contains more than 0.1%. Then, the upper limit is defined as 0.1%. A preferred content is 0.005 to 0.06%. A further preferred content is 0.01 to 0.04%.

Ca: 0 to 0.01%

Ca is an optionally added. When added, it combines with S in the steel to form sulfides and improves a shape of inclusions, which improves the SSC resistance. In order to obtain this, it has contain 0.0001% or more. On the other hand, the effect is saturated and the toughness and the SSC resistance deteriorate due to the formed coarse inclusions of Ca, even when it contains more than 0.01%. Then, the upper limit is defined as 0.01%. A preferred range is from 0.0003 to 0.003%.

Mg: 0 to 0.01%

Mg is an optionally added. When added, it combines with S in the steel, similar to Ca, to form sulfides and improve the shape of the inclusions and improve the SSC resistance. In order to obtain this, it has to contain 0.0001% or more. On the other hand, the effect is saturated and the toughness and the SSC resistance deteriorate due to the formed coarse inclusions of Mg, even when it contains more than 0.01%, the upper limit is defined as 0.01%. A preferred range is from 0.0003 to 0.003%.

EXAMPLE 1

Steels of the chemical compositions shown in Table 3 were melted into billets with a 225 to 310 mm outer diameter. After heating the billets to 1250° C., they were formed into seamless steel pipes of various sizes by a Mannessmann-mandrel pipe making method. In this case, the total working ratio (%) upon forming and the finishing temperature (° C.) upon the final rolling were varied. Then, the strength was controlled by the quenching of water cooling after keeping them at various temperatures for 30 min, followed by tempering of air cooling after keeping at various temperatures for 30 min.

TABLE 3

| Steel | C | Si | Mn | P | S | sol. Al | Cr | Mo | Ti | V | B | Nb | Zr | Ca | Mg | N | O |
|---|---|---|---|---|---|---|---|---|---|---|---|---|---|---|---|---|---|
| A | 0.25 | 0.20 | 0.44 | 0.005 | 0.0031 | 0.030 | 0.51 | 0.73 | 0.015 | 0.11 | 0.0011 | — | — | — | — | 0.0041 | 0.0040 |
| B | 0.29 | 0.18 | 0.45 | 0.004 | 0.0022 | 0.031 | 0.49 | 0.74 | 0.014 | 0.25 | 0.0010 | — | — | — | — | 0.0053 | 0.0033 |
| C | 0.27 | 0.22 | 0.51 | 0.005 | 0.0019 | 0.033 | 0.51 | 0.95 | 0.016 | 0.24 | 0.0006 | — | — | — | — | 0.0037 | 0.0028 |

Chemical composition (mass %)

TABLE 3-continued

Chemical composition (mass %)

| Steel | C | Si | Mn | P | S | sol. Al | Cr | Mo | Ti | V | B | Nb | Zr | Ca | Mg | N | O |
|---|---|---|---|---|---|---|---|---|---|---|---|---|---|---|---|---|---|
| D | 0.25 | 0.19 | 0.43 | 0.006 | 0.0034 | 0.029 | 0.95 | 0.71 | 0.014 | 0.11 | 0.0005 | 0.024 | — | — | — | 0.0033 | 0.0038 |
| E | 0.27 | 0.18 | 0.44 | 0.003 | 0.0025 | 0.033 | 0.68 | 0.73 | 0.013 | 0.06 | 0.0009 | — | 0.015 | — | — | 0.0038 | 0.0044 |
| F | 0.25 | 0.23 | 0.41 | 0.006 | 0.0051 | 0.034 | 0.51 | 0.54 | 0.015 | 0.11 | 0.0009 | 0.022 | 0.013 | — | — | 0.0039 | 0.0028 |
| G | 0.25 | 0.21 | 0.35 | 0.005 | 0.0028 | 0.021 | 0.53 | 0.75 | 0.013 | 0.09 | 0.0007 | — | — | 0.0031 | — | 0.0037 | 0.0031 |
| H | 0.27 | 0.24 | 0.76 | 0.005 | 0.0021 | 0.033 | 0.53 | 0.73 | 0.016 | 0.12 | 0.0009 | 0.025 | — | 0.0035 | — | 0.0043 | 0.0034 |
| I | 0.30 | 0.22 | 0.30 | 0.002 | 0.0018 | 0.021 | 0.54 | 0.71 | 0.013 | 0.06 | 0.0011 | — | 0.009 | 0.0033 | — | 0.0028 | 0.0046 |
| J | 0.29 | 0.12 | 0.76 | 0.005 | 0.0011 | 0.024 | 0.21 | 0.68 | 0.013 | 0.20 | 0.0008 | 0.023 | 0.014 | 0.0022 | — | 0.0035 | 0.0031 |
| K | 0.28 | 0.20 | 0.43 | 0.004 | 0.0023 | 0.021 | 0.50 | 0.74 | 0.013 | 0.11 | 0.0009 | — | — | — | 0.0022 | 0.0045 | 0.0045 |
| L | 0.27 | 0.17 | 0.44 | 0.005 | 0.0018 | 0.023 | 0.51 | 0.69 | 0.015 | 0.10 | 0.0012 | 0.031 | — | — | 0.0018 | 0.0050 | 0.0061 |
| M | 0.29 | 0.18 | 0.40 | 0.003 | 0.0025 | 0.024 | 0.48 | 0.71 | 0.008 | 0.09 | 0.0009 | — | 0.010 | — | 0.0017 | 0.0043 | 0.0031 |
| N | 0.26 | 0.16 | 0.44 | 0.004 | 0.0018 | 0.026 | 0.52 | 0.73 | 0.014 | 0.10 | 0.0010 | — | — | 0.0011 | 0.0012 | 0.0051 | 0.0041 |
| O | 0.28 | 0.18 | 0.45 | 0.005 | 0.0022 | 0.032 | 0.50 | 0.76 | 0.008 | 0.15 | 0.0011 | 0.024 | 0.008 | — | 0.0028 | 0.0060 | 0.0034 |
| P | 0.27 | 0.15 | 0.42 | 0.003 | 0.0021 | 0.030 | 0.50 | 0.81 | 0.014 | 0.10 | 0.0010 | 0.021 | — | 0.0010 | 0.0013 | 0.0052 | 0.0033 |
| Q | 0.28 | 0.22 | 0.45 | 0.004 | 0.0015 | 0.025 | 0..51 | 0.71 | 0.009 | 0.10 | 0.0011 | — | 0.011 | 0.0011 | 0.0011 | 0.0053 | 0.0030 |
| R | 0.27 | 0.19 | 0.46 | 0.006 | 0.0021 | 0.028 | 0.49 | 0.67 | 0.008 | 0.09 | 0.0012 | 0.030 | 0.009 | 0.0012 | 0.0013 | 0.0051 | 0.0041 |
| S | 0.27 | 0.13 | 0.42 | 0.007 | 0.0009 | 0.022 | 0.54 | 0.94 | 0.015 | 0.12 | 0.0015 | — | — | — | — | 0.0039 | 0.0038 |
| T | 0.26 | 0.27 | 0.44 | 0.008 | 0.0024 | 0.034 | 1.01 | 0.75 | 0.015 | 0.10 | 0.0004 | — | — | — | — | 0.0035 | 0.0035 |
| U | 0.25 | 0.33 | 0.45 | 0.006 | 0.0031 | 0.023 | 0.51 | 0.78 | 0.015 | 0.19 | 0.0003 | — | — | — | — | 0.0041 | 0.0043 |
| V | 0.26 | 0.24 | 0.48 | 0.005 | 0.0022 | 0.024 | 1.23* | 0.76 | 0.017 | 0.11 | 0.0001 | — | — | — | — | 0.0038 | 0.0041 |
| W | 0.29 | 0.22 | 0.46 | 0.004 | 0.0022 | 0.035 | 0.98 | 0.45* | 0.015 | 0.09 | 0.0005 | — | — | — | — | 0.0041 | 0.0046 |
| X | 0.27 | 0.20 | 0.45 | 0.006 | 0.0016 | 0.019 | 0.53 | 0.77 | 0.013 | 0.03* | 0.0009 | — | — | — | — | 0.0036 | 0.0048 | note:
The balance is Fe and impurities.
*shows out of scope of the present invention.

A test piece sized 1×10×10 mm³ was sampled from the obtained seamless steel pipe, polished by 1200# emery paper, then the work hardened layer was removed from the surface of the test piece by immersing it in an aqueous hydrogen peroxide solution at a room temperature, with an addition of a small amount of hydrofluoric acid. It was subjected to an X-ray diffraction test in order to measure the half-value width for the peak on the [211] crystal face.

Further, round bars, with a parallel portion diameter of 6 mm and a parallel portion length of 40 mm, were sampled as a tensile test piece from the steel materials in the rolling direction, and subjected to a tensile test at a room temperature, and the strength of the test piece was determined based on the measured value for YS.

The SSC resistance was evaluated according to two methods, the constant load test and the DCB test, which are described above.

Further, disk pieces of 12 to 20 mm diameter and 1.5 mm thickness were sampled as test pieces from the steel materials and the hydrogen diffusion coefficient was measured by a hydrogen permeation test.

Table 4 shows the manufacturing conditions for the steel materials, YS, half-value width, hydrogen diffusion coefficient and results of the SSC test.

TABLE 4

| | Test No. | Steel | Total work ratio (%) | Rolling finishing temp. (° C.) | Quenching temp. (° C.) | Strength YS (MPa) | Half value width H | Hydrogen diffusion coefficient D(10⁻⁶ cm²/s) | 30H + D | Test bath | SSC test result Constant load test | SSC test result DCB test (stress intensity factor K$_{ISSC}$) |
|---|---|---|---|---|---|---|---|---|---|---|---|---|
| Present Invention | 1 | A | 17.8 | 1100 | 920 | 944 | 0.42 | 3.10 | 15.7 | A | ○ | 31.1 |
| | 2 | B | 20.5 | 1050 | 910 | 958 | 0.46 | 2.40 | 16.2 | A | ○ | 27.3 |
| | 3 | C | 15.3 | 1030 | 920 | 965 | 0.35 | 2.10 | 12.6 | A | ○ | 29.3 |
| | 4 | D | 13.8 | 1040 | 920 | 951 | 0.37 | 1.80 | 12.9 | A | ○ | 29.5 |
| | 5 | E | 25.3 | 960 | 1050 | 971 | 0.47 | 1.90 | 16.0 | A | ○ | 29.3 |
| | 6 | F | 8.2 | 1030 | 930 | 944 | 0.54 | 2.00 | 18.2 | A | ○ | 31.3 |
| | 7 | G | 13.8 | 990 | 920 | 951 | 0.46 | 3.50 | 17.3 | A | ○ | 30.4 |
| | 8 | H | 14.1 | 1100 | 920 | 944 | 0.45 | 4.30 | 17.8 | A | ○ | 26.4 |
| | 9 | I | 14.6 | 1010 | 920 | 958 | 0.42 | 1.90 | 14.5 | A | ○ | 31.1 |
| | 10 | J | 36.5 | 1050 | 920 | 951 | 0.51 | 1.30 | 16.6 | A | ○ | 31.4 |
| | 11 | K | 20.5 | 1100 | 920 | 958 | 0.46 | 2.3 | 16.1 | A | ○ | 28.5 |
| | 12 | L | 21.5 | 1050 | 920 | 951 | 0.47 | 2.4 | 16.5 | A | ○ | 29.14 |
| | 13 | M | 20.5 | 1100 | 920 | 944 | 0.45 | 1.9 | 15.4 | A | ○ | 30.2 |
| | 14 | N | 21.5 | 1050 | 920 | 958 | 0.47 | 2.1 | 16.2 | A | ○ | 29.5 |
| | 15 | O | 19.5 | 1050 | 1050 | 951 | 0.48 | 2.3 | 16.7 | A | ○ | 28.3 |
| | 16 | P | 19.5 | 1050 | 920 | 958 | 0.41 | 2.2 | 14.5 | A | ○ | 29.1 |
| | 17 | Q | 20.5 | 1100 | 920 | 951 | 0.45 | 1.8 | 15.3 | A | ○ | 31.0 |
| | 18 | R | 19.5 | 1050 | 920 | 958 | 0.45 | 2.3 | 15.8 | A | ○ | 29.5 |
| Comparative | 19 | S | 63.5 | 1050 | 920 | 944 | 0.59 | 2.20 | 19.9 | A | X | 24.1 |
| | 20 | T | 15.5 | 930 | 920 | 937 | 0.61 | 6.31 | 24.6 | A | X | 19.1 |
| | 21 | U | 15.5 | 1050 | 920 | 944 | 0.49 | 6.90 | 21.6 | A | X | 23.4 |
| | 22 | V | 15.5 | 1040 | 920 | 937 | 0.61 | 2.31 | 20.6 | A | X | 22.6 |
| | 23 | W | 24.6 | 1050 | 920 | 944 | 0.59 | 6.90 | 24.6 | A | X | 19.8 |
| | 24 | X | 25.5 | 1030 | 920 | 937 | 0.61 | 7.31 | 25.6 | A | X | 18.1 |

TABLE 4-continued

|  | Test No. | Steel | Total work ratio (%) | Rolling finishing temp. (° C.) | Quenching temp. (° C.) | Strength YS (MPa) | Half value width H | Hydrogen diffusion coefficient D($10^{-6}$ cm$^2$/s) | 30H + D | Test bath | SSC test result Constant load test | DCB test (stress intensity factor $K_{ISSC}$) |
|---|---|---|---|---|---|---|---|---|---|---|---|---|
| Present Inven- tion | 25 | A | 17.8 | 1100 | 920 | 861 | 0.42 | 3.10 | 15.7 | B | ○ | 30.1 |
|  | 26 | B | 20.5 | 1050 | 910 | 854 | 0.46 | 2.40 | 16.2 | B | ○ | 29.4 |
|  | 27 | C | 15.3 | 1030 | 920 | 861 | 0.35 | 2.10 | 12.6 | B | ○ | 28.8 |
|  | 28 | D | 13.8 | 1040 | 920 | 854 | 0.37 | 3.80 | 14.9 | B | ○ | 29.4 |

Test Nos. 1 to 18 indicate test pieces having strength controlled to the YS value in the vicinity of 965 MPa (upper limit for 125 ksi class). The SSC test (constant load test, DCB test) was conducted with the bath A for evaluation. In all of the test pieces, the half-value width H and the hydrogen diffusion coefficient D ($10^{-6}$ cm$^2$/s) satisfied the equation (1) described previously. No fracture occurred in the constant load test, and the $K_{ISSC}$ value, as measured by the DCB test, was 25 or more, and the SSC resistance was favorable.

On the contrary, the total working ratio was large for test No. 19, the rolling finishing temperature was low for test No. 20 and the quenching temperature was low for test No. 21. Accordingly, the half-value width and the hydrogen diffusion coefficient increased, and the SSC resistance was not favorable for any of them. Cr was more than 1.0% for test No. 22, Mo was less than 0.5% for test No. 23 and V was less than 0.05% for test No. 24. Accordingly, the half-value width and the hydrogen diffusion coefficient increased, and the SSC resistance was not favorable in any of them.

Further, test Nos. 25 to 28 indicate test pieces using steels A to D and having strength controlled to the YS value in the vicinity of 861 MPa (upper limit for 110 ksi class). Such test pieces, like the test Nos. 1 to 18, showed no fracture in the constant load test, and the $K_{ISSC}$ value measured by the DCB test was 25 or more and the SSC resistance was favorable.

As described above the steels of the invention shows that an excellent SSC resistance in the 125 ksi class in test Nos. 1 to 18 as well as an excellent SSC resistance in 110 ksi class in test Nos. 21 to 28.

INDUSTRIAL APPLICABILITY

The present invention can stably provide an oil well pipes having excellent SSC resistance even with a high strength of 861 MPa or more of yield stress (YS).

BRIEF DESCRIPTION OF THE ACCOMPANYING DRAWINGS

Figure 1:
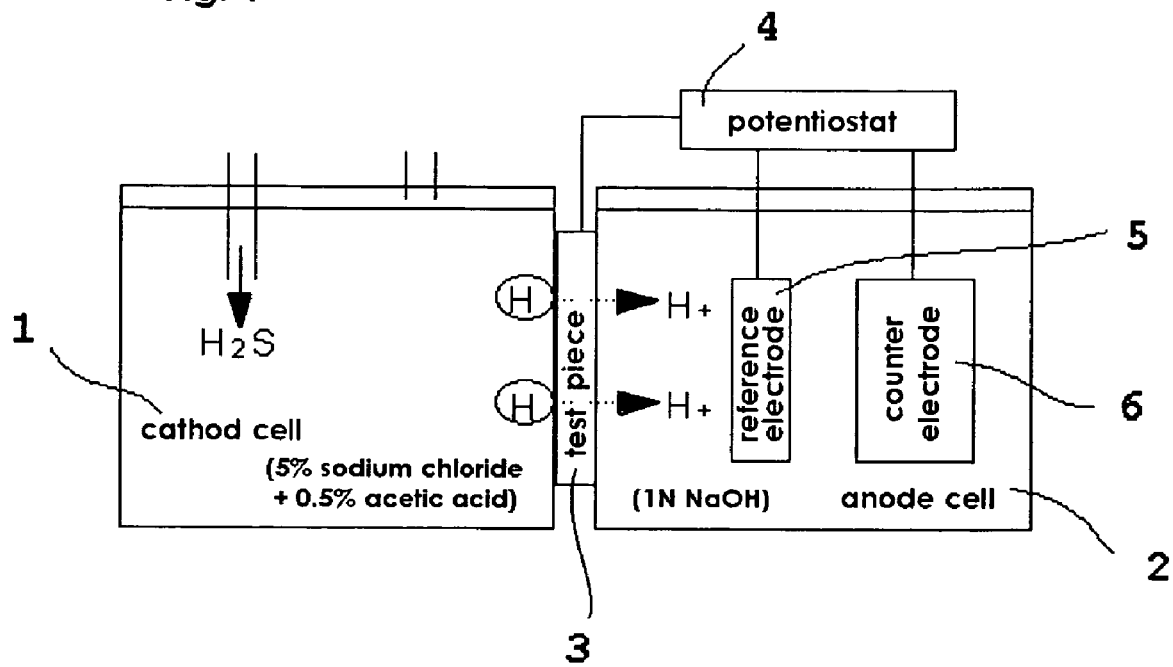
FIG. 1 shows a schematic view of a hydrogen permeation test apparatus. The bath used for the SSC test fills inside the cell on the side of the intruding hydrogen (cathode cell 1). An aqueous 1N NaOH solution fills the inside the cell on the opposite side (anode cell 2), and a test piece 3 is kept at a constant potential of 0 V relative to the reference electrode 5 (silver-silver chloride electrode in this embodiment). Hydrogen atoms generated in the cathode cell are oxidized into hydrogen ions at the instance they permeate the test piece and are released to the anode cell. The value of the current flowing between the test piece and the counter electrode 6 (platinum counter electrode in this embodiment) is measured by a potentiostat 4 as the hydrogen permeation current value.
Figure 2:
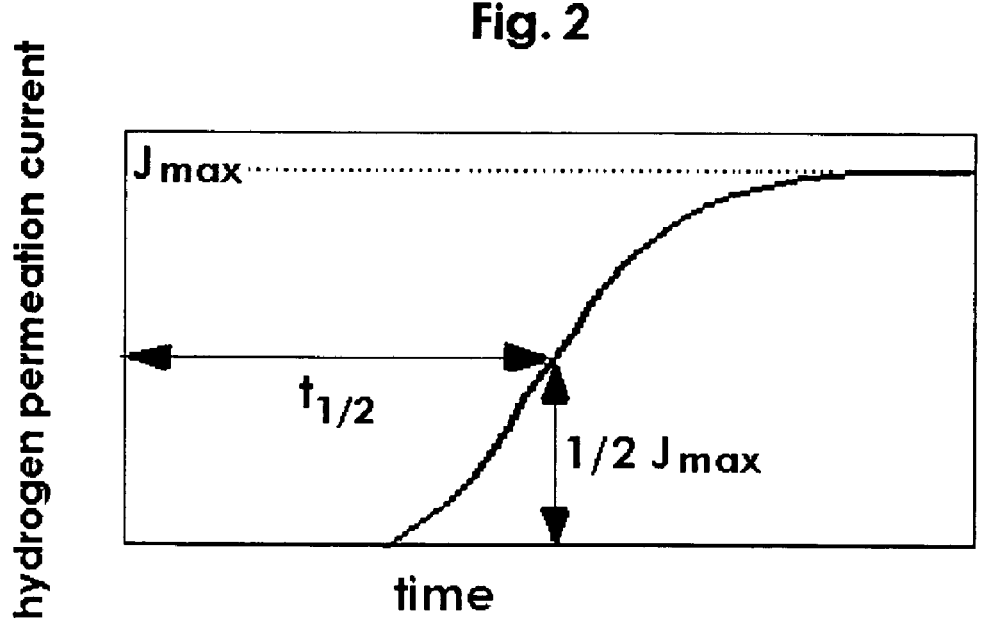
FIG. 2 is a graph showing the hydrogen permeation current value measured as a result of the hydrogen permeation test. After the immersion of the test piece in the solution, permeation of hydrogen occurs with a lapse of time until the hydrogen permeation current value finally reaches the value for stationary state ($J_{max}$), in which the hydrogen diffusion coefficient D, showing the hydrogen trapping ability of the steel materials, is measured based on the transition process (rising of the curve) up to the stationary state. In this case, the hydrogen diffusion coefficient D is calculated based on the time $t_{1/2}$ required for reaching the half-value of the stationary state value ($J_{max}$) according to the following equation (2).

FIG. 1 is a schematic view of a hydrogen permeation test apparatus.
FIG. 2 is a graph showing a hydrogen permeation current value measured as a result of a hydrogen permeation test.

FIG. 3 is a graph arranging a result of the constant load test in which the horizontal axis expresses a half-value width H and the column expresses a hydrogen diffusion coefficient D ($\times 10^{-6}$ cm$^2$/s).

FIG. 4 shows a result of investigation for correlation between a total working ratio (%) and the half-value width H for the steel (a) in Table 1.

FIG. 5 shows the result of investigation for the correlation between a rolling finishing temperature (° C.) and the half-value width H, and correlation between the rolling finishing temperature (° C.) and the hydrogen diffusion coefficient ($\times 10^{-6}$ cm$^2$/s) for the steel (a) in Table 1.

FIG. 6 shows a result of the investigation for the correlation between a quenching temperature (° C.) and the half-value width H, as well as correlation between the quenching temperature (° C.) and the hydrogen diffusion coefficient ($\times 10^{-6}$ cm$^2$/s) for the steel (a) in Table 1.

| [Explanation of Numerals] | |
|---|---|
| 1 | cathode cell |
| 2 | anode cell |
| 3 | test piece |
| 4 | potentiostat |
| 5 | reference electrode |
| 6 | counter electrode |

The invention claimed is:

1. A low alloy steel for oil well pipes consisting of, by mass %, C: 0.25 to 0.35%, Si: 0.05 to 0.3%, Mn: 0.05 to 1.0%, P: 0.025% or less, S: 0.01% or less, Al: 0.005 to 0.10%, Cr: 0.1 to 1.0%, Mo: 0.6 to 1.0%, Ti: 0.002 to 0.05%, V: 0.05 to 0.3%, B: 0.0001 to 0.005%, N: 0.01% or less. O (oxygen): 0.01% or less, Ca: 0 to 0.01%, Mg: 0 to 0.01% and Zr: 0 to 0.1%, and the balance Fe and impurities, which has a stress intensity factor $K_{ISSC}$ value of 25 or more measured in accordance with the NACE TM 0177D method, and has a half-value width H for the peak of the [211] crystal face and a hydrogen diffusion coefficient D ($10^{-6}$ cm$^2$/s) that satisfy the following equation (1):

$$30H + D \leq 19.5 \quad \text{equation (1).}$$

2. The low alloy steel for oil well pipes according to claim 1, wherein a yield stress is 861 MPa or more.

* * * * *

UNITED STATES PATENT AND TRADEMARK OFFICE
CERTIFICATE OF CORRECTION

PATENT NO.         : 8,168,010 B2                              Page 1 of 1
APPLICATION NO.    : 11/640030
DATED              : May 1, 2012
INVENTOR(S)        : Omura et al.

It is certified that error appears in the above-identified patent and that said Letters Patent is hereby corrected as shown below:

On the Title Page, in item (75), under "Inventors", in Column 1, Lines 1-2, delete "Kenji Kibayashi," and insert -- Kenji Kobayashi, --, therefor.

In the Claims:

In Column 14, Line 45, in Claim 1, delete "less." and insert -- less, --, therefor.

Signed and Sealed this
Twenty-third Day of September, 2014

Michelle K. Lee
*Deputy Director of the United States Patent and Trademark Office*